(12) United States Patent
Ortega et al.

(10) Patent No.: US 7,214,439 B2
(45) Date of Patent: May 8, 2007

(54) TRIBOROHYDRIDE SALTS AS HYDROGEN STORAGE MATERIALS AND PREPARATION THEREOF

(75) Inventors: Jeffrey V. Ortega, Dover Township, Ocean County, NJ (US); Michael T. Kelly, Plainsboro Township, Middlesex County, NJ (US); Jonathan L. Snover, St. Augustine, FL (US); Jason C. Brady, Borough of Red Bank, NJ (US); Ying Wu, Borough of Red Bank, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 321 days.

(21) Appl. No.: 10/741,192

(22) Filed: Dec. 19, 2003

(65) Prior Publication Data

US 2005/0135996 A1    Jun. 23, 2005

(51) Int. Cl.
*H01M 8/06* (2006.01)
*C01B 3/06* (2006.01)
*B01J 7/00* (2006.01)
*C01B 6/19* (2006.01)
*C01B 6/21* (2006.01)
*C10L 1/12* (2006.01)
*C08G 79/08* (2006.01)

(52) U.S. Cl. ............... 429/19; 44/314; 48/61; 423/286; 423/648.1; 528/394

(58) Field of Classification Search ........... 423/286, 423/648.1; 48/61; 44/314; 429/19
See application file for complete search history.

(56) References Cited

U.S. PATENT DOCUMENTS

| | | | | |
|---|---|---|---|---|
| 2,955,911 | A * | 10/1960 | Edwards et al. | 423/286 |
| 3,031,259 | A * | 4/1962 | Edwards et al. | 423/286 |
| 3,171,712 | A * | 3/1965 | Edwards | 423/286 |
| 3,227,512 | A * | 1/1966 | Gunderloy, Jr. | 423/286 |
| 3,313,603 | A | 4/1967 | Hough et al. | |
| 3,328,134 | A * | 6/1967 | Miller et al. | 423/284 |
| 3,564,561 | A | 2/1971 | Livingston et al. | |
| 4,166,843 | A | 9/1979 | Flanagan | |
| 4,672,060 | A | 6/1987 | Hall et al. | |
| 6,319,920 | B1 | 11/2001 | Caroon et al. | |
| 6,534,033 | B1 | 3/2003 | Amendola et al. | |
| 6,586,563 | B1 * | 7/2003 | Ortega et al. | 528/394 |
| 6,652,608 | B1 * | 11/2003 | Orr | 44/360 |
| 6,670,444 | B2 * | 12/2003 | Amendola et al. | 528/394 |
| 2004/0067195 | A1 * | 4/2004 | Strizki et al. | 423/658.2 |
| 2004/0120889 | A1 * | 6/2004 | Shah et al. | 423/657 |
| 2004/0202903 | A1 * | 10/2004 | deVos et al. | 429/19 |
| 2005/0268555 | A1 * | 12/2005 | Amendola et al. | 48/61 |
| 2006/0021279 | A1 * | 2/2006 | Mohring et al. | 48/61 |

OTHER PUBLICATIONS

Hough et al., "The Sodium-Diborane Reaction", J. Am. Chem. Soc., vol. 78, p. 689, 1956, no month.
Hough et al. "The Sodium-Diborane Reaction", J. Am. Chem. Soc., vol. 80, pp. 1828-1829, 1958, no month.
Gaines et al. "Convenient Preparation of Solutions Containing the Triborohydride Ion" Inorganic Chemistry, 1963, No. 2, pp. 526-528, no month.
Miller et al., "Chemistry of Boranes, XX, Synthesis of Polyhedral Boranes", Inorganic Chemistry, 1964, No. 3, pp. 1456-1463, no month.
Kodama et al. "The Preparation and Properties of Amminia-Triborane, H3NB3H7.", J.Am. Chem. Soc., vol. 81, pp. 3534-3538, 1959, no month.
Dewkett et al., Octahydrotriborate(1-) ([B3H8]-) Salts, Inorg. Synth. vol. 15, pp. 111-118, 1974, no month.
Jolly et al., "Hydrolysis of Octahydrotriborate in Cold Acidic Methanol-Water Solutions Preparation of B3H7OH2 and B3H7PH-.", Inorg. Chem. vol. 18, pp. 377-380, 1979, no month.
Beall et al., "Mechanistic Aspects of Boron Hydride Reactions." Inorganica Chimica Acta, vol. 289, pp. 1-10, 1999, no month.

* cited by examiner

*Primary Examiner*—Wayne A. Langel
(74) *Attorney, Agent, or Firm*—Dickstein Shapiro LLP

(57) ABSTRACT

The present invention relates to the use of triborohydride salts as hydrogen storage materials. The present invention also relates to a system of using triborohydride salts to generate hydrogen gas for use in a fuel cell or other hydrogen-consuming device. A novel method of preparing triborohydride salts is also disclosed, wherein gaseous diborane is reacted with a carbonate suspended in a non-aqueous solvent in a suitable vessel with agitation. The process is typically carried out utilizing sodium carbonate to form sodium triborohydride. Other triborohydride salts can then be formed by cationic exchange. Hydrogen generating fuels according to the present invention include aqueous or hydroalcoholic solutions or slurries of a triborohydride salt, which may additionally contain a borohydride salt to provide operation over a broader temperature range.

12 Claims, No Drawings

TRIBOROHYDRIDE SALTS AS HYDROGEN STORAGE MATERIALS AND PREPARATION THEREOF

FIELD OF THE INVENTION

The present invention relates to the use of triborohydride salts as hydrogen storage materials, fuel mixtures containing them and processes for their preparation.

BACKGROUND OF THE INVENTION

Environmentally friendly fuels, e.g., alternative fuels to hydrocarbon-based energy sources, are currently of great interest. Of particular interest is hydrogen which is currently the subject of a considerable research effort focused on the various problems and considerations associated with making it commercially competitive with hydrocarbon-based fuels. Hydrogen, however, is volumetrically inefficient to store and transport. For compact storage, hydrogen must be compressed to high pressure and stored in specialized tanks. Hydrogen can be stored in liquid form at very low temperatures, but consuming a portion of the available energy for the liquefaction. In addition, losses of stored liquid hydrogen due to boil off are considerable, and thus it remains an ineffective storage method. As a result, chemical hydrides, particularly sodium borohydride, have been proposed as effective hydrogen storage materials for a variety of applications in both distributed power generation and transportation applications.

The goal in the study of hydrogen storage materials is to develop candidates that possess high gravimetric hydrogen potential. Chemical hydrides, including alkali metal hydrides, alkali metal aluminum hydrides and alkali metal borohydrides, generate hydrogen through a hydrolysis reaction in water resulting in gravimetric hydrogen densities that range from 9 to 25 weight percent of the hydride. When the waters of reaction and solvation are taken into account, the combined hydrolysis systems have gravimetric hydrogen densities that range from 4 to 9 wt. percent. Among the candidate hydrides, sodium borohydride ($NaBH_4$) is considered the leader for many reasons, including safety and convenience. An aqueous solution of sodium borohydride, stabilized with sodium hydroxide at a pH between 11 and 15, has been used as a hydrogen generation fuel.

Sodium borohydride has been proved in prototype testing to deliver hydrogen in a manner and with load characteristics that are essentially non-distinguishable from that of compressed hydrogen. In addition, the fact that it can be stored as an aqueous solution adds to its advantage as a safe and convenient carrier for hydrogen. A limitation on the use of sodium borohydride as a storage material for hydrogen, however, is its solubility which limits storage solutions to 36 wt. % or less at room temperature, with a maximum gravimetric hydrogen storage of 6.6 wt. %. In addition, the discharged fuel stream is a mixture of sodium borate compounds and sodium hydroxide, which is a spectator in the hydrolysis reaction, and is strongly alkaline. There are, however, regulatory and handling issues associated with the transport and storage of both the fuel solution and the discharged solution because of their high pH.

Because of the advantages of sodium borohydride as a hydrogen storage material, a considerable amount of research has been directed to improving the synthesis thereof over the typical industrial processes that are based on either the Schlesinger process (Equation 1) or the Bayer process (Equation 2), both of which are shown below.

$$4NaH + B(OCH_3)_3 \rightarrow 3NaOCH_3 + NaBH_4 \quad (1)$$

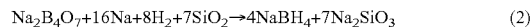

$$Na_2B_4O_7 + 16Na + 8H_2 + 7SiO_2 \rightarrow 4NaBH_4 + 7Na_2SiO_3 \quad (2)$$

The Schlesinger process and the Bayer process do not provide a favorable energy balance, because the energy cost of using large amounts of sodium in these reactions is high compared to the energy available from sodium borohydride as a fuel.

A second area of research has focused on the sodium borate byproduct of the use of sodium borohydride as a fuel. In order to gain widespread acceptance, a means must be found to convert the borate byproduct into a useful material, preferably sodium borohydride itself thereby regenerating the fuel. Another aspect of the research concerning the discharged fuel solution is the sodium hydroxide, which must either be recovered and reused or disposed of in an environmentally acceptable manner.

While sodium borohydride remains a primary candidate for an alternative fuel system to fossil fuel, there remains the need for other materials that might serve as hydrogen storage materials for such systems that would possess advantage over sodium borohydride. In accordance with the present invention, it has been found that a metal triborohydride has significant advantages as a hydrogen storage material.

Metal triborohydride salts are known materials. U.S. Pat. No. 3,313,603 claims a number of triborohydride salts and a process for their preparation. The primary interest in these salts to date has been as reducing agents and as intermediates in the synthesis of higher boranes, polyhedral borane anions and transition-metal complexes. U.S. Pat. No. 4,166,843 discloses a method of generating pure hydrogen by combusting a solid propellant formed by adding silicon or aluminum to alkyl-substituted quaternary ammonium octahydrotriboronitride salts. The silicon or aluminum are present to complex available carbon molecules from the combustion that would otherwise react with the hydrogen to form methane. In this way, the combustion of the solid propellant is able to generate pure hydrogen. However, the use of these salts in solid propellants does not suggest that they might be useful as hydrogen storage materials in the fuel compositions of the present invention.

Triborohydride salts are typically produced by the reaction of diborane ($B_2H_6$) or a higher borane with sodium metal, sodium amalgam, sodium hydride or sodium borohydride. This synthesis has a significant energy cost hurdle because of the large amounts of sodium required. In addition, the reactions of diborane with sodium or sodium amalgam are slow, typically requiring two days for complete reaction at room temperature. While sodium borohydride is a more reactive species, triborohydride formation only takes place at temperatures in excess of 100° C. at one atmosphere pressure of diborane. While the temperature may be lowered, it is only at the expense of raising the pressure of diborane above one atmosphere.

The reaction of diborane and sodium borohydride may also be conducted at high temperatures in ether, but this reaction entails the expense and handling of the solvent. Other preparations of triborohydride salts include the hydroboration of alkali metal compounds of naphthalene or triphenylboron; the reduction of $BH_3$oTHF by metals, such as potassium, rubidium, cesium and the like; and the reaction of diborane with a metal naphthalide. None of these preparations is advantageous in terms of the potential use of triborohydride salts as hydrogen storage materials.

In accordance with the present invention, it has been found that triborohydride salts are useful as hydrogen storage materials. In order that such use may have practical potential for large scale application, an improved preparation of triborohydride salts is provided that is advantageous over preparations known to date.

SUMMARY OF THE INVENTION

In one embodiment of the present invention, hydrogen storage materials are provided comprising triborohydride salts. A second aspect of the present invention concerns a hydrogen generation system utilizing aqueous fuels containing triborohydride salts as hydrogen sources. The aqueous fuel mixtures of triborohydride salts may further contain borohydride salts. The present invention also concerns an improved method of preparing triborohydride salts, wherein diborane is reacted with a carbonate suspended in a nonaqueous solvent in a suitable vessel with agitation. The process is typically carried out utilizing sodium carbonate to form sodium triborohydride. Other triborohydride salts may then be formed by cationic exchange.

DETAILED DESCRIPTION OF THE INVENTION

One aspect of the present invention relates to the use of triborohydride salts as hydrogen storage materials for the generation of hydrogen to power fuel cells or other hydrogen consuming devices. The triborohydride salts are represented by the general formula $MB_3H_8$, wherein M is an alkali metal, pseudo-alkali metal, alkaline earth metal, ammonium ion, phosphonium cation, and quaternary amines of the formula $NR_4^+$, wherein each R is triborohydride salts include, without intended limitation, $NaB_3H_8$, $KB_3H_8$, $CsB_3H_8$, $Ba(B_3H_8)$ and $(CH_3)_4NB_3H_8$. For the ease of description, all of the following reactions assume M is a cation having a 1+valence. However, when M is chosen to have a 2+valence, the stoichiometry can be adjusted accordingly as will be clearly evident to the skilled artisan.

A triborohydride salt, such as illustrated above, can react with water to produce hydrogen and a borate in accordance with the following chemical reaction:

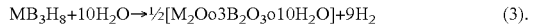

$$MB_3H_8 + 10H_2O \rightarrow \frac{1}{2}[M_2O_o3B_2O_3o10H_2O] + 9H_2 \qquad (3).$$

In the absence of a catalyst, this reaction does not occur at an appreciable rate because triborohydride salts, although highly soluble in water or other aqueous solutions, are also stable in aqueous solution.

Reaction (3) can be catalyzed by a variety of acids and transition metals. Acid catalysts can be any acidic solution known to a person skilled in the art. Inorganic acids are preferred with mineral acids, such as hydrochloric acid, sulfuric acid, and phosphoric acid, being particularly preferred. Such acid catalysts can be diluted in water or be in a concentrated form for efficiency of operation. Transition metal catalysts can be any transition metal known in the art. However, transition metals from the nickel, cobalt and iron families have been found to possess the highest catalytic activity, with cobalt and ruthenium being particularly preferred.

It is important to note that, in reaction (3), all hydrogen atoms in the triborohydride salts and half of those in water are converted into hydrogen. When sodium salts are used, the theoretic hydrogen conversion ratio is 28.6% by weight of the sodium triborohydride ($NaB_3H_8$) used in the reaction.

When the weight of the water is taken into consideration, a stoichiometric mixture of sodium triborohydride and water releases an amount of hydrogen equivalent to 7.4% of the combined weight of the reagents. Consequently, triborohydride salts are more hydrogen dense than the corresponding borohydride salts. In the case of sodium salts, only 14 g of sodium triborohydride are required to generate an amount of hydrogen equivalent to that produced by 20 g of sodium borohydride under similar conditions. Furthermore, sodium triborohydride is more water soluble than sodium borohydride, thus enabling the preparation of more concentrated fuel solutions and, hence, higher hydrogen storage efficacy.

As stated above, triborohydride salts are water soluble and stable in aqueous solution. Thus, unlike metal hydrides such as sodium borohydride, triborohydride salts do not require the addition of strongly alkaline agents, such as by sodium hydroxide, to stabilize them against premature undesirable degradation with the liberation of hydrogen. Consequently, the traditional problems associated with the use of strong alkaline stabilizers will not be encountered when using triborohydride salts as described above. Additionally, triborohydride salts are stable in lower alkanols and lower alkanol-water mixtures. Lower alkanol-water mixture, e.g. methanol-water, are advantageous in that the presence of the alkanol lowers the freezing point of the aqueous fuel, enabling triborohydride salts to operate as a fuel in an extended range of temperatures. Further, the salt formed in reaction (3), borate in the instance of a metal borohydride, is non-toxic, environmentally safe and can be regenerated into borohydride for future use.

Another aspect of the current invention relates to a system for generating hydrogen, comprising an aqueous triborohydride fuel and a catalyst for promoting the reaction of triborohydride to produce hydrogen. The term "aqueous fuel", as used herein, includes a liquid in which all the components are dissolved and/or a slurry in which some of the components are dissolved and some of the components are undissolved solids. Such a fuel may be an aqueous or hydroalcoholic solution or slurry. It is contemplated herein that aqueous fuels in the form of slurries for economy of handling and storage are combined with sufficient water at time of use to form solutions of the triborohydride salt. Further, the term "about" as used herein, means plus or minus 10% of the stated value. In one embodiment of the invention, aqueous solutions of sodium triborohydride are used for controlled hydrogen generation through a hydrolysis reaction as shown in reaction (3). The sodium triborohydride used in the aqueous solution can be in the range from about 0.1 wt. % to its maximum solubility.

The system provided in accordance with the present invention includes means for contacting the aqueous fuel with the catalyst. Such means include means to physically separate the catalyst from the triborohydride fuel when there is no demand for hydrogen gas. When there is a demand for hydrogen, the triborohydride solution can be brought into contact with the catalyst so that the hydrolysis reaction (3) occurs and hydrogen is produced. The separation of catalyst can be achieved by using any mechanical, chemical, electrical and/or magnetic method that can be readily appreciated by a person skilled in the art. In one embodiment, different chambers are used to separate the catalyst from the triborohydride solution. The triborohydride solution can be stored in a fuel reservoir, from which it is pumped into the catalyst chamber and contacts the catalyst to generate hydrogen. In an alternative embodiment, the catalyst can be inserted into and removed from a tank containing the hydride solution. In a further embodiment, the fuel and the catalyst are both in liquid form which can be pumped into the reaction chamber as needed to generate hydrogen.

The triborohydride solution may be pumped into the system either batchwise or continuously. Further, the catalyst chamber may comprise at least one conduit, through which hydride solution can be directed to flow into and out of the chamber at different stages of the catalysis reaction. The conduit may also function as output channel for discharging hydrogen gas generated by the hydrolysis reaction (3).

It is important to note that a separate chamber may not be necessary when insoluble metals or metals bound to, entrapped within, and/or coated onto a substrate are used as the catalyst in reaction (3). Suitable substrates for metal catalysts include, without intended limitation, plastics, polymers, textiles, metals, metal oxides, ceramics, or carbonaceous materials. In a preferred embodiment, the system of the present invention includes a containment system wherein the catalyst is entrapped by physical or chemical means onto and/or within a porous or nonporous substrate, including metallic meshes and fibers as shown in U.S. Pat. No. 6,534,033, which is incorporated by reference herein. In any of these embodiments, the hydrogen generation system may comprise only one chamber, wherein the separation of the catalyst from the triborohydride aqueous fuels can be achieved by removing the insoluble or supported catalyst from the solution thereby interrupting contact between the catalyst and the triborohydride therein. Consequently, when hydrogen production is desired, the catalyst can simply be reinserted into the aqueous fuel to catalyze reaction (3) as described above.

Since triborohydride salts are stable in the absence of a catalyst, the generation of hydrogen in accordance with reaction (3) can be closely controlled by regulating the contact of triborohydride fuel with catalyst. The control can be achieved by regulating the flow of fuel solution to the catalyst, or by withdrawing the catalyst from the fuel solution, depending on the actual setup of the hydrogen generating system and the configuration thereof. In a system that uses a supported or deposited catalyst, hydrogen production can be controlled by contacting with or separating the bound catalyst from the triborohydride fuel solution. For example, the catalyst metal can be attached to a piston or the like, which can move in and out of the fuel solution in response to hydrogen demand. Alternatively, the supported catalyst can be contained in a separate chamber the flow of the triborohydride fuel solution into the chamber is controlled by valves and a suitable regulator means. For a homogeneous catalyst, e.g. an acid solution, the control of hydrogen generation is achieved by regulating the flow of either the triborohydride solution or the catalyst solution or both. Preferably, a mixing chamber is used wherein the two solutions are injected or pumped into the chamber so that they are mixed and the hydrolysis reaction will occur.

The hydrogen gas formed in the hydrolysis reaction is co-eluted with the liquid borate by-product. Consequently, in a preferred embodiment, a gas-liquid separator is used to separate hydrogen gas from the effluent solution, which comprises essentially metal borate salts and water. Additionally, to accommodate immediate demand for hydrogen gas, it is preferred to incorporate a small buffer tank into the present system. In such an embodiment, the small buffer tank always contains a supply of hydrogen gas for instantaneous demand for hydrogen. Once hydrogen is withdrawn from the buffer tank, the resulted pressure drop can trigger the system to produce more hydrogen gas so that a constant level of hydrogen gas is maintained therein.

The hydrogen gas generated by the current system can be directed to a fuel cell or a hydrogen-consuming device for direct use. In the alternative, the hydrogen gas can be stored in a gas reservoir or buffer tank as described above for future use.

The triborohydride fuel solution in accordance with the present invention may contain other hydrides, such as borohydride salts, in order to achieve a desired characteristic, such as hydrogen production efficacy, hydrogen storage density, and/or fuel stability. Such a mixture can be in the form of an aqueous solution, a slurry, a dry mixture of solid salts, or the combination thereof. For instance, it is known that the rate of uncatalyzed hydrolysis of sodium triborohydride is lower than that of sodium borohydride. It is also known that the rate of hydrolysis of sodium triborohydride is temperature dependent, and that hydrogen production is typically not seen at temperatures below 20° C. On the other hand, the hydrolysis of sodium borohydride does occur at such low temperatures. Hence, a preferred fuel mixture for use at low temperatures is a combination of sodium borohydride and sodium triborohydride. When such a combination fuel solution contacts the catalyst, the sodium borohydride will react and begin to generate hydrogen. Because the reaction is exothermic, the temperature will be raised to a point where the sodium triborohydride will begin to hydrolyze. In this way, fuels can be prepared that are useful over a wider range of temperatures.

In accordance with the present invention, concentrated solutions of triborohydride can be used to transport and store hydrogen at high gravimetric densities. For example, a solution with more than 30 wt. % sodium triborohydride is convenient and compact for transporting and storing hydrogen, although at such a high concentration, there is not enough water present in the solution for complete hydrolysis of the triborohydride. The concentrates can be diluted when used, preferably in a hydrogen generator and utilizing the water generated from the hydrolysis reaction. Another source of water to dilute the fuel solution is from the reaction product of a hydrogen-consuming device that is operably connected with the hydrogen generation system. Such devices include fuel cells, combustion engines, gas turbines, and combinations thereof. In the alternative, the concentrates can be diluted at a refuel station.

The hydrogen generating system described herein is safe and efficient in generating hydrogen gas. The system is completely inorganic and produces a high quality energy source without polluting emissions. The system is also readily controllable in a sense that hydrogen is only produced when the solution contacts the catalyst. Further, the present invention can be adapted into different hydrogen fuel systems for different usage, such as in connection with fuel cells to power vehicles with different physical and mechanical requirements.

Another aspect of the current invention relates to a novel method of making triborohydride salts. The reaction takes place as shown in reaction (5) whereby gaseous diborane ($B_2H_6$) is disproportionated to generate triborohydride salts:

$$5B_2H_6 + 2M_2CO_3 \rightarrow 3MB_3H_8 + MBO_2 + 2CO_2 + 3H_2 \qquad (5)$$

wherein M is as defined above. Preferably, M is $Li^+$, $Na^+$, $K^+$, $Cs^+$, $NR_4^+$, or a quaternary ammonium ion. Most preferably, M is $Na^+$, $Li^+$, or $K^+$. However, other cations can also be used in reaction (5) above. When a cation with more than $1^+$ valence is chosen, the stoichiometry can be adjusted accordingly as can be readily perceived by the skilled artisan.

In one preferred embodiment, M is Na⁺. Thus, sodium triborohydride can be produced by reacting sodium carbonate with diborane. During the reaction, sodium borohydride is an intermediate which promotes the further disproportionation of diborane to produce sodium triborohydride. Preferably, gaseous diborane is reacted with a carbonate, with agitation, in a suitable vessel wherein the carbonate is suspended in a non-aqueous solvent. A suitable vessel may contain paddles to agitate the mixture and means to bubble diborane through the suspended carbonate. Such a reactor can advantageously be incorporated into a process for the generation of diborane in that the product can be introduced directly into the reactor, thereby eliminating the need to store large quantities of diborane. The reaction is carried out at temperatures ranging from about −30° C. and 120° C., preferably from about 70° C. and 80° C. under an inert atmosphere, such as nitrogen or argon gas.

Examples of suitable nonaqueous aprotic solvents include, without limitation, hydrocarbons, such as hexane or heptane; amides, such as dimethylacetamide; and glymes, such as diethylene glycol dimethyl ether (diglyme) and tetra(ethylene glycol)dimethyl ether (tetraglyme). Examples of suitable nonaqueous polar solvents include, without limitation, methanol, ethanol, propanol, isopropanol, and ionic liquids such as imidazolium, pyridinium, phosphonium, and tetraalkylammonium compounds.

Besides sodium triborohydride ($NaB_3H_8$), other triborohydride salts can also be produced by reacting the corresponding carbonate salts with diborane as shown in reaction (5) above. On the alternative, triborohydride salts other than sodium triborohydride ($NaB_3H_8$) can be produced by cation exchange with $NaB_3H_8$, as is well known in the art.

Comparing with the traditional method of preparing triborohydride salts, the process described herein is advantageous in that it does not require the use of a large quantity of sodium metal and the high energy cost associated therewith. Further, unlike the traditional reactions which typically require above normal temperature and/or high pressure, the present method of making triborohydride salts can be operated at room temperature and under normal pressure. The following examples further illustrate the current invention, but are not in any way intended as being limiting thereon:

EXAMPLE 1

Hydrogen Generation from Sodium Triborohydride ($NaB_3H_8$)

A mixture of cobalt and ruthenium metals was deposited on a nickel fiber mat. A sample of the resultant catalyst was placed in a 0.1 M (0.63 wt. %) aqueous solution of sodium triborohydride ($NaB_3H_8$). The evolution of hydrogen gas was evidenced by effervescence in the solution around the metal catalyst, and detected by a hand-held hydrogen gas detector. The mixture was stirred at room temperature for 16 hours until gas evolution ceased. The catalyst was removed from the solution, and the water was removed via rotary evaporation to leave a solid residue. Infrared spectroscopy and $^{11}B$ NMR analysis of the resulting material exhibited signals indicative of a mixture of sodium borate and boric acid, with no B—H bonds present, indicating complete conversion of the triborohydride as shown in equation (3).

EXAMPLE 2

Synthesis of Sodium Triborohydride

Excess sodium carbonate (21.20 g, 200 mmol) was placed in a 400 ml stainless steel reactor containing diglyme (200 ml). The reactor was sealed and then flushed with nitrogen for 1 hour. The reactor was fitted with ports for gas inlet, gas outlet, mechanical stirrer, thermocouple, and rupture disc. Connected to the outlet was a diborane scrubber filled with methanol. The reactor was heated to 75° C. and thereafter diborane gas was allowed to flow through the reactor via an electronic mass flow control (EMFC), entering from the bottom. At a flow rate of 100 ml/min, diborane (571 ml, 20.0 mmol) was added through the reactor at 1 atm. After the addition was complete, the heat was turned off, and the reactor was flushed with nitrogen for 2 hours. The reactor was then opened to the air and the reaction mixture was drained through a filter to remove the unreacted sodium carbonate. The diglyme was removed from the filtrate by rotary evaporation. The resulting oil was washed with hexanes (100 ml) and then dried under a vacuum overnight. The yield of raw material was 2.06 g, and was found to contain mostly sodium triborohydride with small amounts of sodium borohydride and sodium borate. The raw material was then extracted with diethyl ether (300 ml). The insoluble material was removed by gravimetric filtration, and the diethyl ether was removed from the filtrate by rotary evaporation. The resulting oil was dried under vacuum overnight at room temperature. The yield of the mono-solvated sodium triborohydride etherate was 936.4 mg (6.805 mmol, 56.7%). Tris-dioxane solvated sodium triborohydride could be obtained as a fine powder by adding dioxane (100 ml) to the etherate.

What is claimed is:

1. A method of generating hydrogen gas comprising reacting a triborohydride salt represented by the formula $MB_3H_8$ with water in the presence of a hydrogen generating catalyst which comprises a transition metal catalyst, wherein M is selected from the group consisting of alkali metals, pseudo-alkali metals, alkaline earth metals, ammonium ions, phosphonium cations, and quaternary amines of the formula $NR_4^+$, wherein each R is independently selected from the group consisting of hydrogen, a straight-chain $C_{1-4}$ alkyl group, and a branched-chain $C_{1-4}$ alkyl group.

2. A method in accordance with claim 1, wherein M is selected from the group consisting of Na⁺, Li⁺, K⁺, Mg⁺⁺ and Ca⁺⁺.

3. A method in accordance with claim 2, wherein M is Na⁺.

4. A method in accordance with claim 1, wherein the catalyst comprises one or more transition metals selected from the group consisting of metal family of nickel, metal family of cobalt and metal family of iron.

5. A method in accordance with claim 4, wherein the catalyst is ruthenium, cobalt or mixtures thereof.

6. A hydrogen generation system, comprising (a) an aqueous fuel containing a triborohydride salt represented by the formula $MB_3H_8$, wherein M is selected from the group consisting of alkali metals, pseudo-alkali metals, alkaline earth metals, ammonium ions, phosphonium cations, and quaternary amines of the formula $NR_4^+$, wherein each R is independently selected from the group consisting of hydrogen, a straight-chain $C_{1-4}$ alkyl group, and a branched-chain $C_{1-4}$ alkyl group; and (b) a hydrogen generating catalyst which comprises a transition metal catalyst, and (c) means to contact the aqueous fuel with the catalyst thereby generating hydrogen.

7. A hydrogen generation system in accordance with claim 6, wherein the hydrogen generating catalyst comprises a substrate having molecules of a transition metal bound thereto, entrapped within, and/or coated thereon and said means to contact comprises a containment system for said catalyst such that the catalyst can be moved into and out of contact with the aqueous fuel.

8. A hydrogen generation system in accordance with claim 7, wherein said substrate is selected from the group consisting of plastics, polymers, textiles, metals, metal oxides, ceramics, and carbonaceous materials.

9. A hydrogen generation system in accordance with claim 6, additionally comprising a buffer tank, wherein a constant level of hydrogen gas is maintained for immediate demand of hydrogen gas.

10. A hydrogen generation system in accordance with claim 6, additionally including a gas-liquid separator to separate hydrogen from the effluent stream.

11. A hydrogen generation system in accordance with claim 6, wherein at least a portion of the water in said aqueous fuel is obtained from the reaction product of a hydrogen-consuming device, said device being operably connected with said system.

12. A hydrogen generation system in accordance with claim 11, wherein the hydrogen-consuming device is selected from the group consisting of a fuel cell, a combustion engine, a gas turbine, and combinations thereof.

* * * * *